No. 887,357. PATENTED MAY 12, 1908.
N. B. STUBBLEFIELD.
WIRELESS TELEPHONE.
APPLICATION FILED APR. 5, 1907.
3 SHEETS—SHEET 1.
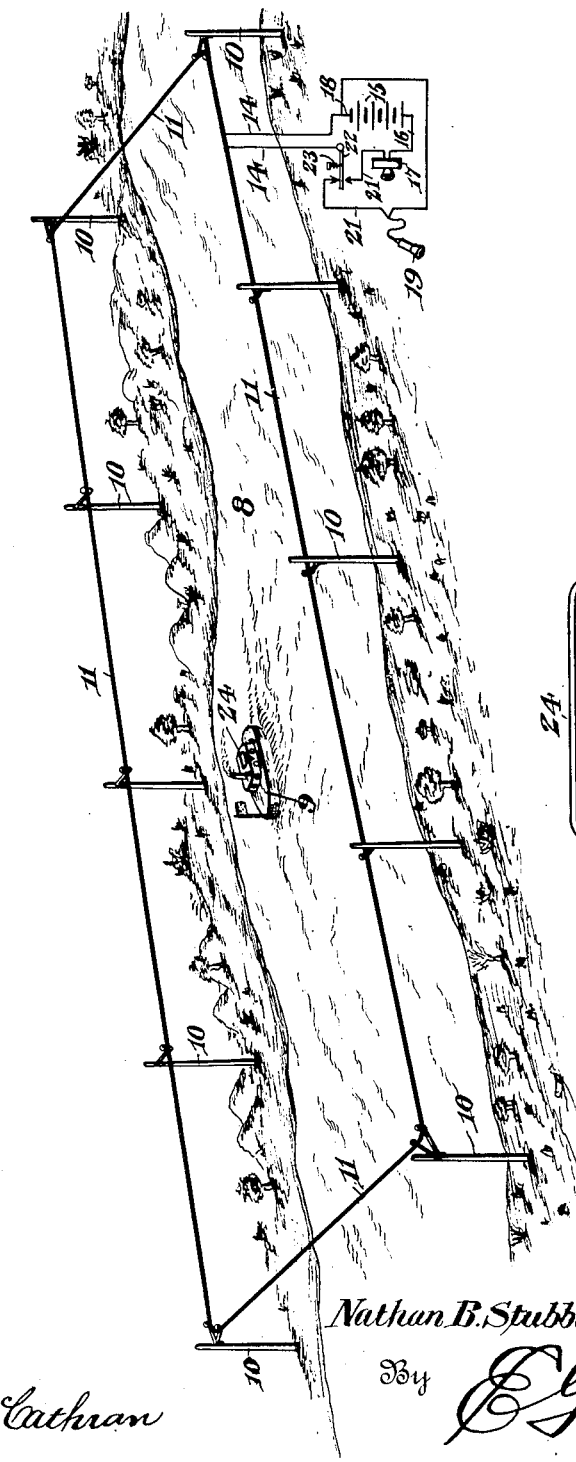
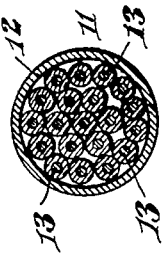
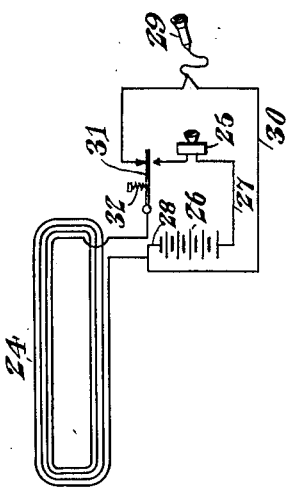
Fig. 1.
Fig. 2.
Fig. 3.
Witnesses
Jas. K. McCathran
B. G. Feter
Nathan B. Stubblefield, Inventor
By C. G. Siggers
Attorney No. 887,357. PATENTED MAY 12, 1908.
N. B. STUBBLEFIELD.
WIRELESS TELEPHONE.
APPLICATION FILED APR. 5, 1907.
3 SHEETS—SHEET 2.
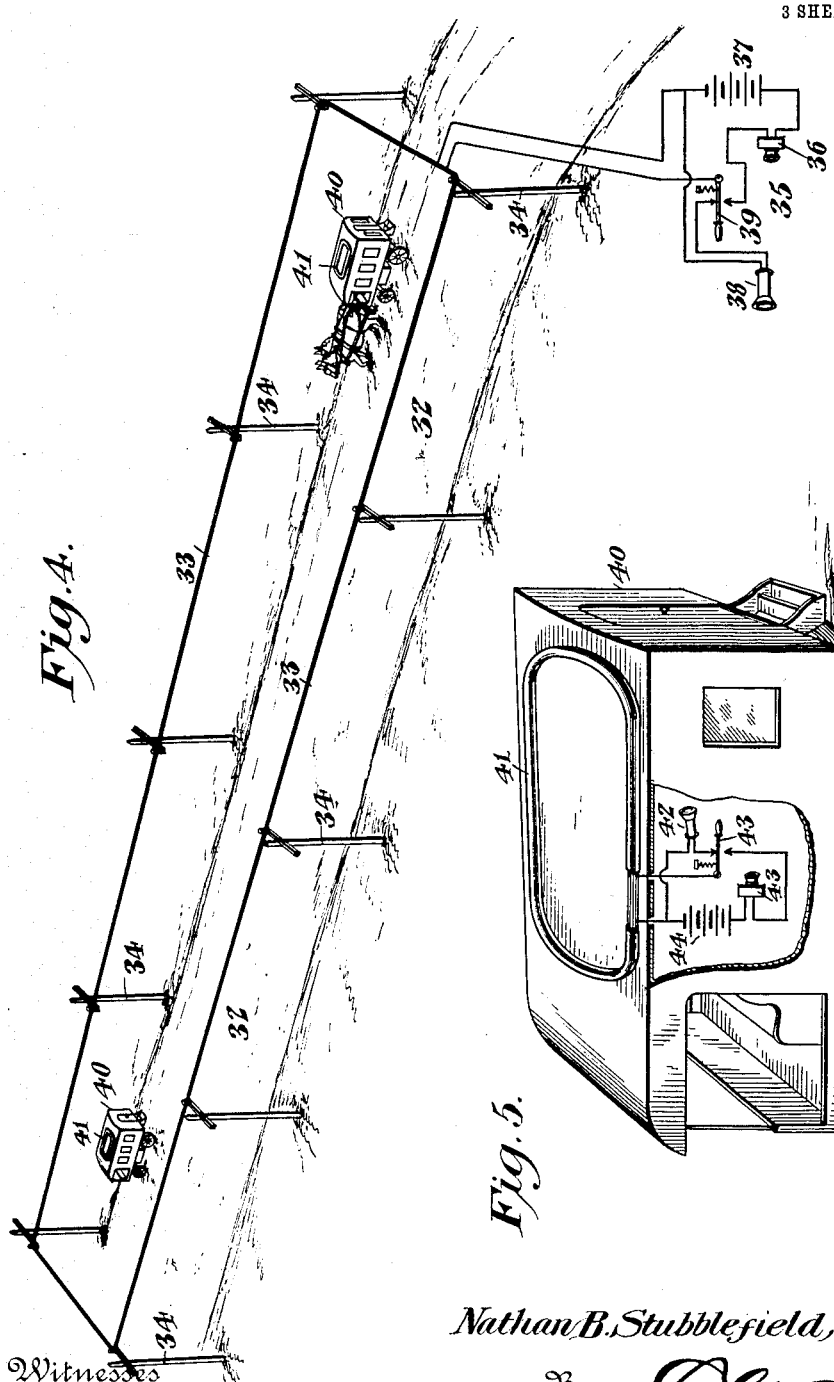
Nathan B. Stubblefield, Inventor
By E. G. Siggers
Attorney
Witnesses
Jas. F. McCathran
B. G. Foster

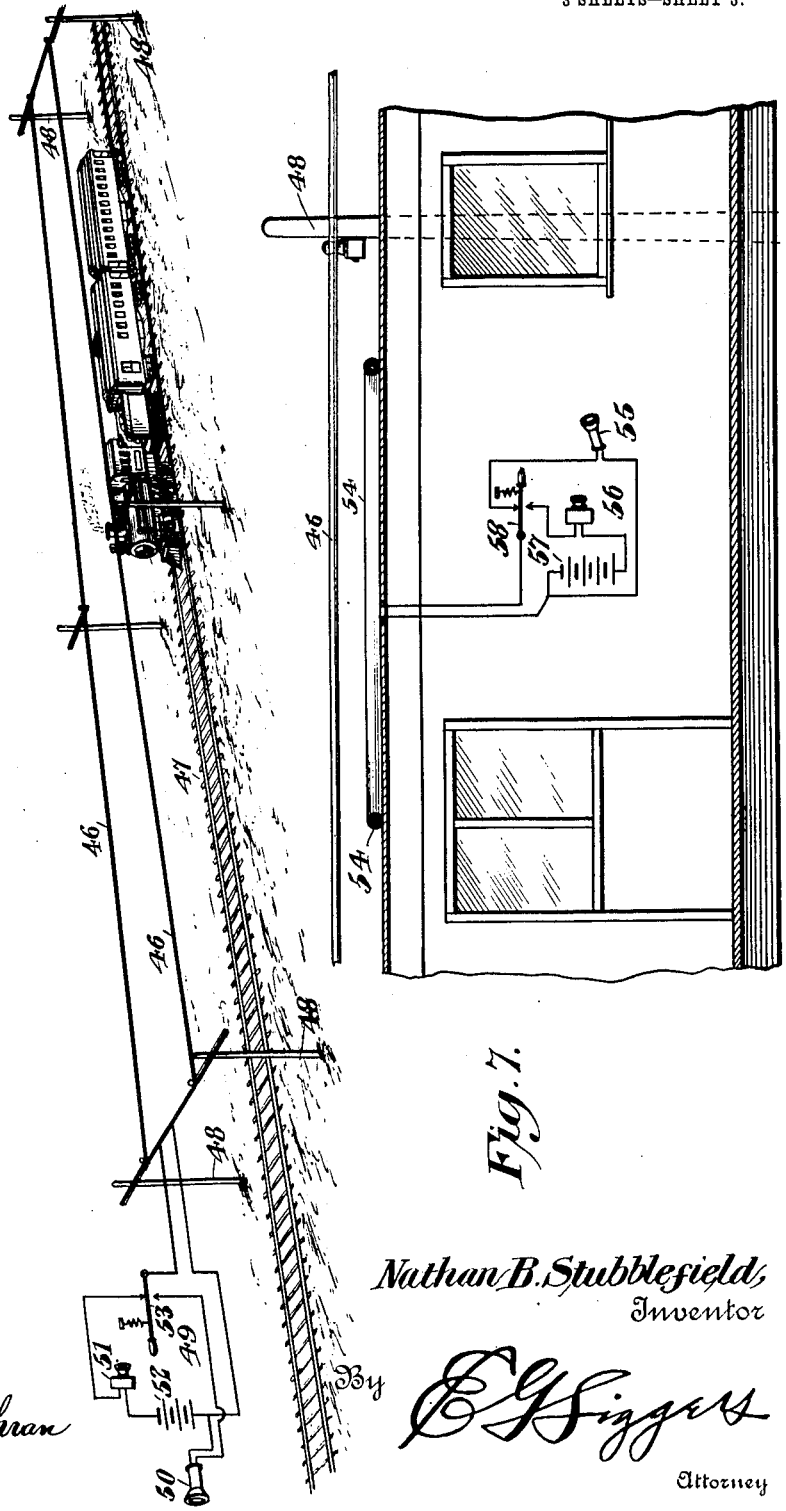

UNITED STATES PATENT OFFICE.

NATHAN B. STUBBLEFIELD, OF MURRAY, KENTUCKY, ASSIGNOR OF TWELVE AND ONE-HALF ONE-HUNDREDTHS TO CONN LINN, FIVE ONE-HUNDREDTHS TO R. DOWNS, FIVE ONE-HUNDREDTHS TO B. F. SCHROADER, FIVE ONE-HUNDREDTHS TO GEORGE C. McLARIN, FIVE ONE-HUNDREDTHS TO JOHN P. McELRATH, TWO AND ONE-HALF ONE-HUNDREDTHS TO JEFF D. ROULETT, AND ONE-TWENTIETH TO SAMUEL E. BYNUM, ALL OF MURRAY, KENTUCKY.

WIRELESS TELEPHONE.

No. 887,357.          Specification of Letters Patent.          Patented May 12, 1908.

Application filed April 5, 1907. Serial No. 366,544.

*To all whom it may concern:*

Be it known that I, NATHAN B. STUBBLEFIELD, a citizen of the United States, residing at Murray, in the county of Calloway and State of Kentucky, have invented a new and useful Wireless Telephone, of which the following is a specification.

The present invention relates to means for electrically transmitting signals from one point to another without the use of connecting wires, and more particularly comprehending means for securing telephonic communication between moving vehicles and way stations.

The principal object of the invention is to provide simple and practical means of a novel nature whereby clear and audible communication can be established, said means being simple and of a character that will permit certain of the station mechanisms to be small and compact.

In the accompanying drawings:—Figure 1 is a perspective view, showing means for establishing communication between a vessel and a shore station. Fig. 2 is a diagrammatic view of the mechanism mounted on the boat. Fig. 3 is a cross sectional view on an enlarged scale of the shore coil. Fig. 4 is a perspective view of a road-way, showing a system for establishing communication between road vehicles and a way-station, the latter being illustrated diagrammatically. Fig. 5 is a detail view of a vehicle equipped with one of the instruments, which is shown diagrammatically. Fig. 6 is a perspective view showing the system applied to a railway for establishing communication between a moving train and a way-station. Fig. 7 is a sectional view through a car showing in diagram the car mechanism illustrated in Fig. 6.

Similar reference numerals designate corresponding parts in all the figures of the drawings.

Referring to the embodiment illustrated in Figs. 1, 2 and 3, a water-way 8 is disclosed, upon which a vessel 9 operates. Surrounding the path of travel of the vessel, and preferably elevated on poles 10, is a coil 11 of considerable magnitude. This coil, as shown in Fig. 3, consists of an outer casing 12, within which is placed a conducting wire comprising a plurality of convolutions 13, each of which is insulated from the other. The terminals 14 of this coil extend to a suitable way-station, and at the station is located a powerful source of electrical energy 15, to which is connected by a suitable wire 16 an electrically operated transmitter 17. The battery or other source of electricity has a connection 18 with one of the leads 14. A receiver 19 of the ordinary type has a connection with the same lead 14, to which the battery is connected, and both the receiver and transmitter have connections 21 with the contacts of a switch 22. This switch has suitable means, as for instance, a spring 23, which normally maintains the receiver in circuit with the coil 11, as will be evident by reference to Fig. 1, but if the switch is thrown to break the circuit, it will then cut in the source of electrical energy 15 and the transmitter 17.

An outfit similar to the above, is located on the vehicle or boat 9, but the coil 24 thereof, shown in Fig. 2, is much smaller. As further illustrated in said figure, the mechanism mounted on the boat, consists of a transmitter 25, and a battery or other source of electrical energy 26 electrically connected, as shown at 27 and having a connection 28 with one of the leads of the coil. The receiver 29 also has a connection 30 with said lead. A switch 31 is connected to the other lead, and is normally held in a position by a spring 32 to maintain a closed circuit through the receiver 29 and the coil, though it may be moved to cut out said receiver and close the circuit through the coil, the source of electrical energy and the transmitter.

In this system, if it is desired to transmit from one station, as for instance, the shore-station, the switch 22 is moved downwardly to cut out the receiver and throw in the transmitter and source of electrical energy, while the operator upon the boat or vehicle leaving the mechanism in the condition shown in Fig. 2, holds the receiver 29 to his ear. If therefore the operator at the shore-station uses the transmitter in the ordinary manner, a varying current corresponding to that passing through the coil of great magnitude 11, will be induced in the coil 24, and the speech or other sounds will thus be transmitted to the operator on the boat. By reversing the arrangement, speech may be transmitted from the boat to the shore station.

The use of coils for both stations, each coil consisting of a plurality of convolutions has been found by experience to be of the utmost value, and furthermore experience has demonstrated that the employment of coils of different magnitudes is of great importance, for it has been found that while two small coils can be used to transmit but a short distance, if one large coil of the character set forth is employed, the other may be very small, and speech or sounds can be transmitted comparatively great distances from one to the other. These sounds are clearly audible.

The structure disclosed in Figs. 4 and 5 is of the same general character. A road-way 32 is disclosed surrounded by a coil 33 of great magnitude that is supported on suitable poles 34. The way-station 35 consists of a transmitter 36, a source of electrical energy 37 connected thereto, a receiver 38, and a switch 39, whereby the receiver or the transmitter and source of electrical energy can be thrown into circuit with the coil 33. The vehicles 40, which operate on the road-way, are provided with smaller coils 41 and instruments consisting of receivers 42, transmitters 43, sources of electrical energy 44 and switches 45 all arranged in the manner already described. In a system of this kind, it will be evident that the occupant of one vehicle may telephone to the home or way-station, and the message can be transmitted to another vehicle. Thus it will be evident that communication can be established between two moving vehicles or between a way-station and any vehicle desired which is within the range of the home- or way-station. The system is also capable of use in connection with railways, and in Figs. 6 and 7, such a system is disclosed in connection therewith. A comparatively great coil 46 is supported on opposite sides of the railway 47 by poles 48 and a station 49 has a receiver 50 and a transmitter 51, a source of electrical energy 52 and a switch 53, the last mentioned being employed for throwing either the receiver or the transmitter and source of electrical energy into closed circuit with the coil 46. One or more cars of a railway train is equipped with an outfit consisting of a coil 54, a receiver 55, a transmitter 56, a source of electrical energy 57, and a switch 58 for throwing either the receiver or the transmitter and source of electrical energy into circuit with the coil 54. It will be evident that the operation of these two last described systems are substantially the same as that first set forth, and no extended description thereof is believed to be necessary.

From the foregoing, it is thought that the construction, operation, and many advantages of the herein described invention will be apparent to those skilled in the art, without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a system of the character described, the combination with a vehicle, of a comparatively small coil of conducting material mounted thereon, electrical transmitting and receiving mechanism including a source of electrical energy connected to the small coil and carried by the vehicle, a stationary aerial coil of much greater magnitude than the small coil having its opposite stretches or sides extending along the opposite sides of the path of travel of the vehicle and elevated above the same and above the vehicle coil, and electrical transmitting and receiving mechanism connected to the greater coil and including a source of heavy electrical current.

2. In a system of the character described, the combination with a vehicle, of a coil of conducting material mounted thereon, electrical transmitting mechanism, a source of electrical energy connected thereto, receiving mechanism, means for connecting either the transmitting mechanism and source of electrical energy or the receiving mechanism to the coil, a stationary coil of greater magnitude surrounding the path of travel of the vehicle and comprising a plurality of convolutions of conducting material, the different convolutions being insulated one from the other, means for supporting the coil in an elevated position, electrical transmitting mechanism, a source of great electrical energy connected to said transmitting mechanism, electrical receiving mechanism, and means for electrically connecting either the transmitting mechanism and source of electrical energy or the receiving mechanism to the said coil of greater magnitude.

3. Means for communicating between a plurality of stations which consists of an aerial electrical coil of great magnitude, means for supporting the said coil, a station electrically connected to the great coil and comprising transmitting and receiving mechanism that includes a source of heavy electrical energy, and a plurality of other separate stations simultaneously in coacting relation with the aerial coil, each of said latter stations comprising a coil of conducting material spaced from but in coacting relation with said great coil and below the same, and transmitting and receiving mechanism connected to said other coil and including a source of electrical energy.

4. Means for communicating between a plurality of stations which consists of an aerial coil of conducting material of great magnitude, transmitting and receiving mechanism connected to said aerial coil and including a source of heavy electrical energy, a plurality of vehicles movable between the opposite sides or stretches of the great coil, coils carried by said vehicles and disposed within the field of action of the aerial coil, and transmitting and receiving mechanism mounted on each vehicle and including a source of electrical energy.

In testimony, that I claim the foregoing as my own, I have hereto affixed my signature in the presence of two witnesses.

NATHAN B. STUBBLEFIELD.

Witnesses:
J. P. McELRATH,
J. H. COLEMAN.